(No Model.)  4 Sheets—Sheet 1.
W. M. SCHLESINGER.
ELECTRIC RAILWAY.
No. 408,855. Patented Aug. 13, 1889.
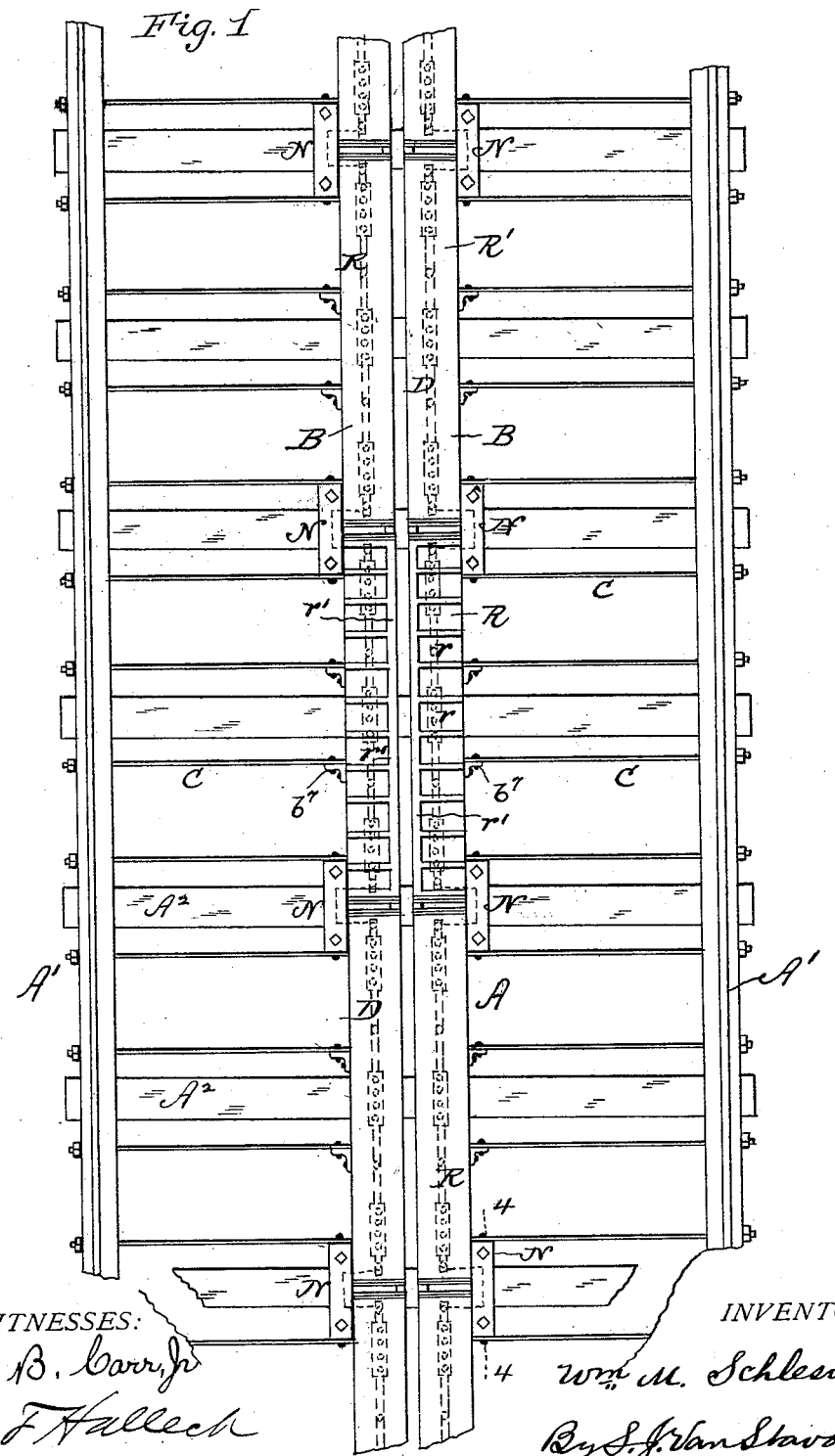
WITNESSES:
J. B. Carr, Jr.
M. F. Halleck
INVENTOR,
Wm. M. Schlesinger
By S. J. Van Stavoren
ATTORNEY (No Model.) 4 Sheets—Sheet 2.
W. M. SCHLESINGER.
ELECTRIC RAILWAY.
No. 408,855. Patented Aug. 13, 1889.
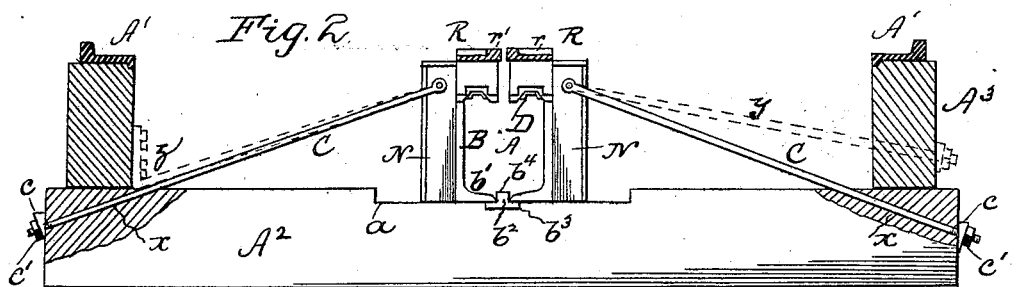
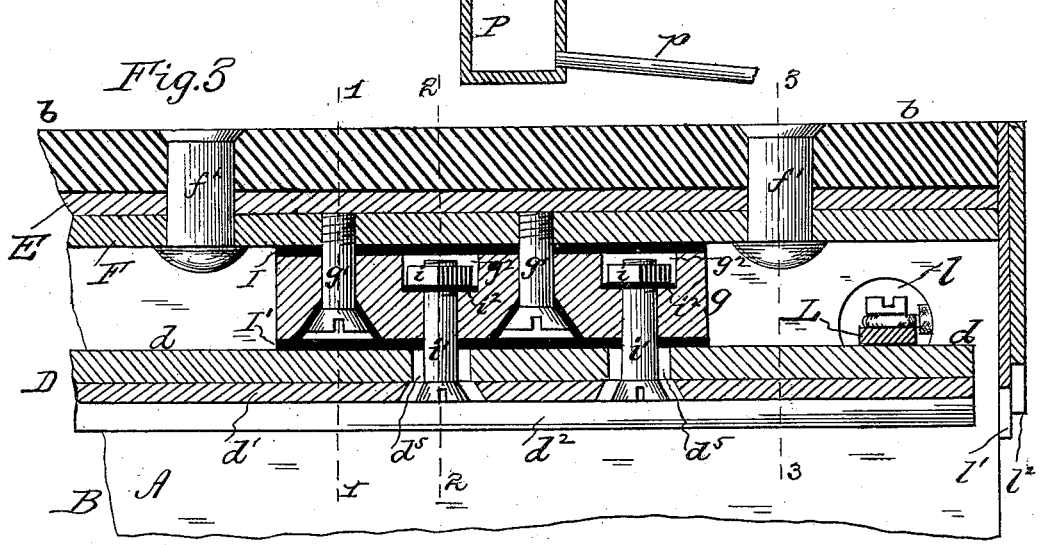
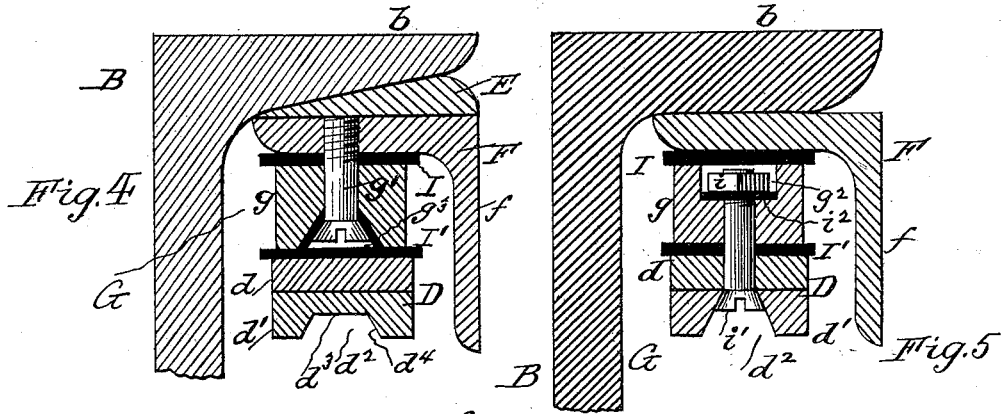
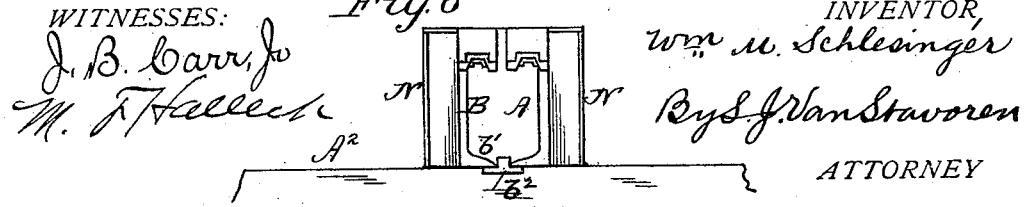
WITNESSES:
J. B. Carr, Jr.
M. F. Halleck
INVENTOR,
Wm. M. Schlesinger
By S. J. Van Stavoren
ATTORNEY (No Model.) 4 Sheets—Sheet 3.
W. M. SCHLESINGER.
ELECTRIC RAILWAY.
No. 408,855. Patented Aug. 13, 1889.
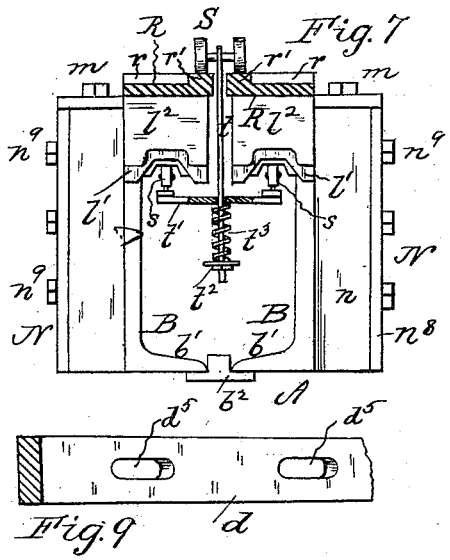
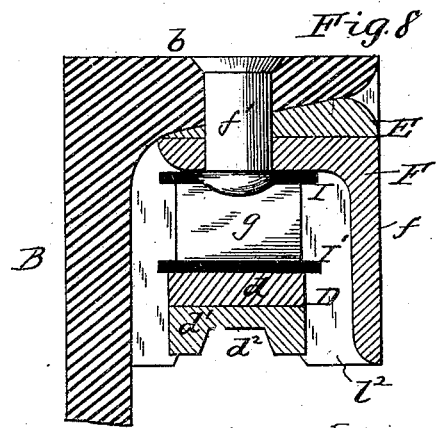
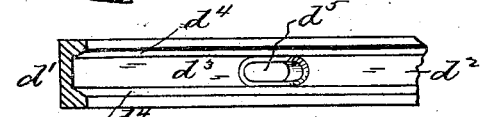
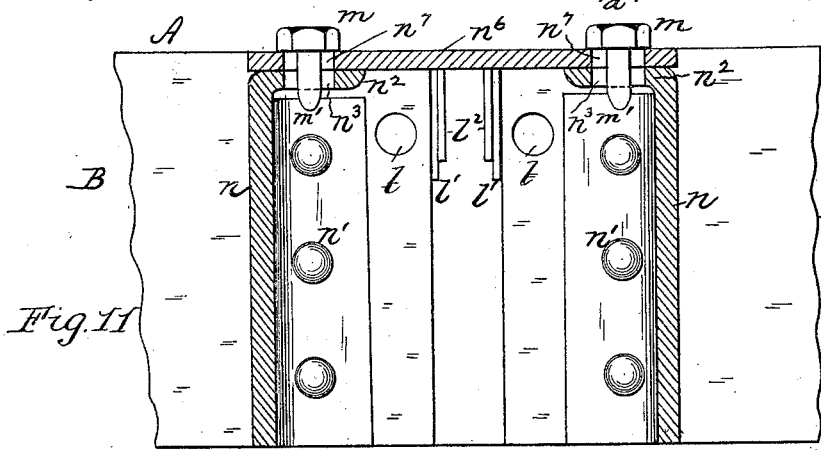
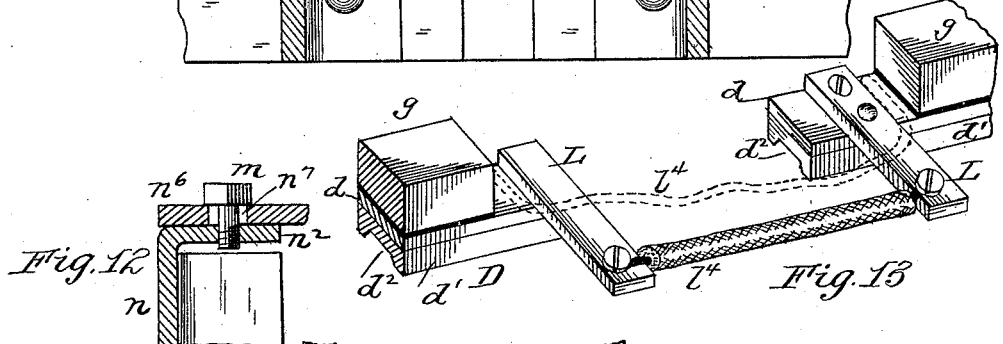
WITNESSES:
J. B. Carr, Jr.
M. F. Hallett
INVENTOR,
Wm. M. Schlesinger
By S. J. VanStavoren
ATTORNEY
N. PETERS, Photo-Lithographer, Washington, D. C.

(No Model.) 4 Sheets—Sheet 4.
W. M. SCHLESINGER.
ELECTRIC RAILWAY.
No. 408,855. Patented Aug. 13, 1889.
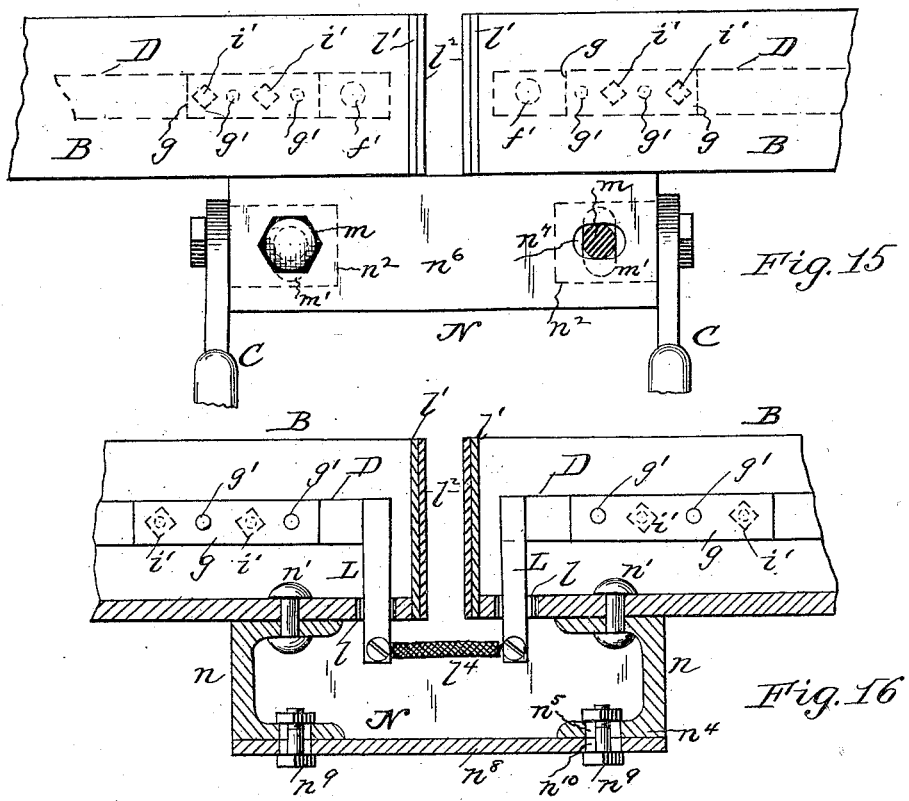
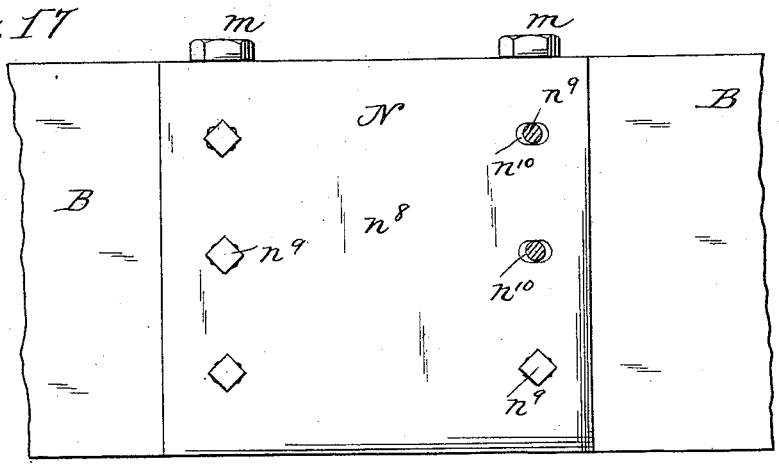
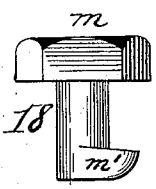
WITNESSES:
J. B. Carr, Jr
M. L. Halleck
INVENTOR,
Wm. M. Schlesinger
By S. J. VanStuvorn
ATTORNEY

UNITED STATES PATENT OFFICE.

WILLIAM M. SCHLESINGER, OF PHILADELPHIA, PENNSYLVANIA.

ELECTRIC RAILWAY.

SPECIFICATION forming part of Letters Patent No. 408,855, dated August 13, 1889.

Application filed May 29, 1886. Serial No. 203,654. (No model.)

*To all whom it may concern:*

Be it known that I, WILLIAM M. SCHLESINGER, a subject of the Queen of Great Britain, residing at Philadelphia, in the county of Philadelphia and State of Pennsylvania, have invented certain new and useful Improvements in Electric Railways, of which the following is a specification, reference being had therein to the accompanying drawings, wherein—

Figure 1 is a plan showing a part of a line of an electric railway embodying my improvements. Fig. 2 is a cross-section of same. Fig. 3 is a longitudinal section, drawn to an enlarged scale, of part of a conduit-section and one of the conductors, showing the way of securing the latter to the conduit-sections. Fig. 4 is a section on line 1 1, Fig. 3. Fig. 5 is a section on line 2 2, Fig. 3, and showing slight modification of construction of the conduit sides. Fig. 6 is an end view of conduit and front view of part of a cross-tie, showing the conduit made small enough to rest upon the top of the cross-ties without recessing or cutting them. Fig. 7 is a like view of conduit, partly sectional, with trolley or carriage running on the conduit and having contacts with upward spring-pressure. Fig. 8 is a section on line 3 3, Fig. 3. Fig. 9 is a perspective of copper plate or bar for the compound conductor, showing elongated slots therein to admit of its expansion and contraction. Fig. 10 is a like view of the steel or iron plate or bar, with elongated slots, for the compound conductor. Fig. 11 is a section on line 4 4, Fig. 1, or through one of the outside boxes connecting the adjacent ends of two adjoining conduit-sections, the connections for the conductors not being shown. Fig. 12 is a detail section of part of same, showing modification of screw-connection for securing the covers to said outside boxes. Fig. 13 is a perspective showing conductor connections or couplings through said boxes. Fig. 14 is an end view of conduit, partly broken away, showing modified form of bottom block for separating the longitudinal lengths or sides composing the conduit-sections. Fig. 15 is a plan view drawn to an enlarged scale, partly sectional, of the outside boxes connecting adjacent ends of adjoining conduit-sections. Fig. 16 is a horizontal section through the same in the line of the conductors. Fig. 17 is a side elevation of same; and Fig. 18 is an elevation of preferable form of fastening-bolt for the covers of said outside boxes.

My invention has relation to that form of electric railways wherein the conductors are placed in a conduit having slotted top or cover, through the slot of which passes the support, bar, frame, or plow having conductor-contacts and traveling with the car; and it has for its object the construction of the conduit and conductors, and the couplings or connections between the conduit-sections and the conductors, whereby the conduit-sections and the conductors are free to independently or separately expand and contract under the influence of natural or other causes without affecting the strength or durability of the connections securing them together, free and quick access is obtainable to the couplings or connections between the conductor sections or lengths under all conditions of service for repairs or other purposes, as near perfect insulation for the conductors is obtained as is possible, and an economical and durable construction of line secured.

My invention accordingly consists of the combination, construction, and arrangement of parts, as hereinafter described and claimed.

In the drawings, A represents a line of conduit for a line of railway-track A', which conduit is preferably placed midway between the rails A', and rests either upon the top of the sleepers A², as shown in Fig. 6, or upon the top of a recess a, cut in the upper part of the same, as indicated in Fig. 2 or it may otherwise be suitably laid and located as desired.

To make a cheap, strong, and durable conduit, I prefer to make it in sections which are separate from one another, and each section consists, preferably, of two sides, which are composed of any suitable form of iron beams or girders B B, having top and bottom inside flanges $b$ and $b'$, respectively, on their inner sides. These beams, when in position to form a conduit-section, are placed preferably parallel to each other with their flanges $b$ $b'$ approaching one another, but being sufficient distance apart to provide a slot between them both at the top and bottom of the conduit-section, as plainly shown in Figs. 1, 2, 6, and 7. The sides or girders B B are kept apart by suitably-inverted T-shaped blocks $b^2$, the horizontal limb $b^3$ of which either loosely rests upon or is secured to the sleepers $A^2$, as desired, and the vertical limb $b^4$ passes up between the bottom flanges $b'$ of the girders, which flanges rest upon the limb $b^3$ and impinge against the vertical limb $b^4$. The latter may be straight, as shown in Figs. 1, 6, and 7, or have outwardly-flaring sides $b^5$, as shown in Fig. 14, to form pockets or recesses $b^6$ in the sides of blocks $b^2$ corresponding in outline to the edge of the bottom flanges $b'$ of the girders to lessen the liability of said flanges cutting or grinding into said blocks under the influence of lateral pressure or weight upon the conduit-sections. The top parts of the girders or the sides of the conduit-sections are provided with L-shaped or other form of lugs $b^7$, to which are secured braces C, which preferably connect with the sleepers $A^2$ by means of end plates or washers $c$ and adjusting-nuts $c'$, as indicated at $x$, Fig. 2, or with the stringers $A^3$ by corresponding plates and nuts, as shown by dotted lines $y$ in said figure, or have bent ends bolted to the stringers, as illustrated by dotted lines $z$, Fig. 2. In all cases the direction of the braces is downward to obtain the best or greatest strength of bracing for maintaining the width of the slot in the top of the conduit and prevent it closing against lateral pressure.

Two girders or beams B B, with their flanges $b$ $b'$, make a conduit-section, the girders forming the sides and their flanges the top and bottom of the conduit-section, and each side or half of the section is separate from the other, as shown; hence the conduit-sections of a line may be expeditiously and economically laid down without making an undue width of trench or ditch for the same and without undue tearing up of the street or roadway. The cross-ties not being cut, the strength of the same for preserving the gage of the road remains intact, and undue lateral pressure upon the sides or girders of the conduit is avoided.

The form of beams above described, it will be noted, is a standard one and used daily in the mechanical arts for various purposes, and as made the flanges $b$ $b'$ are beveled or tapered on one or their inner side, as shown more plainly in Fig. 4.

As I prefer to secure the conductors D to the inner or lower sides of the top flanges $b$, I use a leveling-up strip or bar E, or a bar having in cross-section the form of a wedge, which, when secured to the flanges $b$, as hereinafter set forth, makes the sides of the latter parallel. In case, however, a special form of girder is made for the conduit-sections its top flange $b$ is preferably made with parallel sides, as shown in Fig. 5, in which case the bars or plates E are dispensed with; hence I do not limit myself to the use of these bars nor to any particular configuration of beams or sides B.

To thoroughly insulate the conductors D from the iron beams or sides B, I prefer to secure the former to the latter in the following-described manner for reasons stated:

To the under side of the top flange $b$ of each beam, girder, or side B is secured a bar of angle-iron F, so located that one of its straight sides $f$ is flush with the edge of the flange $b$. When a leveling-bar E is employed, both it and the angle-bar F are secured together to the flange $b$, preferably by riveting, as indicated at $f'$ in Figs. 3 and 8.

The use of the angle-bar serves for two purposes, viz: first, to form deeper or extended sides for the conduit-slot, and, second, to provide channels or gutters G on each side of the slot in the upper part of the conduit for the conductors, so that rain or moisture entering the conduit-slot cannot get access to the conductors, but drips off of the sides $f$ of the angle-bars F to the bottom of the conduit-sections. At intervals along the channel or gutter G, on a beam or side B, plates or blocks of porcelain or other suitable non-conductor $g$ are screwed, as indicated at $g'$, to the angle-bar F, as more plainly shown in Fig. 3, a strip or pad of rubber or other elastic and non-conducting material I being interposed between the angle-bar and blocks $g$. In the top of the latter are provided countersunk or other openings or recesses $g^2$, in which are preferably placed nuts $i$ for engagement with screws or bolts $i'$, which secure the conductor D to blocks $g$, a pad or strip of rubber or other suitable elastic and non-conducting material I' being inserted between the conductor D and the blocks $g$. Suitable elastic and insulating pads or washers of rubber or other material $i^2$ are interposed between the nuts $i$ and the bottom of the recesses $g^2$, and, if desired, between the heads of the screws $g'$ and the countersunk holes $g^3$ in the bottom of blocks $g$, in which holes said screw-heads are located.

By the foregoing-described construction it will be noted that the conductors are secured only to the blocks $g$ and the latter to the angle-irons F or girders B, and the elastic pads I I' intervene between the angle-iron F and block $g$ and between the latter and the conductors D, respectively, the result whereof is that a very high insulation is obtained for the conductors, and the shocks or vibrations incident to travel upon the conduit are more or less absorbed by the elastic pads, and the conductor screw-fastenings are not liable to be shaken loose.

Any suitable form of conductor may be used; but I prefer to use a compound conductor composed of a flat bar of copper $d$ and a bar of steel or iron $d'$, having a grooved under side $d^2$, as shown, for contact with the traveling connections secured to the car. This form of conductor, except as to the configuration of the groove in the iron or steel bar part of the conductor, and the advantages of using the same are fully described and shown in a pending application filed by me August 4, 1885, Serial No. 173,533, and so much of the same as is not hereinafter claimed need not therefore be further alluded to.

The groove $d^2$ in conductor-bar $d'$ has a flat upper side $d^3$, with downwardly-diverging sides $d^4$, as shown, for obtaining better or greater extent of contact-surface with the traveling plow-contacts $s$, (see Fig. 7,) as hereinafter set forth, and the openings $d^5$ in this bar $d'$ and in copper bar $d$, through which the screws $i'$ pass, are in the form of elongated slots, as shown more plainly in Figs. 9 and 10, to admit of said bars expanding and contracting independently of each other under the influence of natural or other causes, and thereby avoid straining their screw-connections or impairing the durability of same.

At or near each end of the beams or girders B a hole or opening $l$ is provided, through which passes, preferably, a strip L, of copper or other suitable conductor, soldered or otherwise secured, as desired, to the copper bar $d$ of the conductors, and these side strips L form means for coupling or connecting together the conductors D of two adjoining conduit-sections to complete the line. These coupling wires or bridges between the ends of the conductors, it will be noted, are free or are not affixed to any support, except the ends of the conductors, and they freely move to compensate for the expansion and contraction of the conduit-sections and of the conductors.

To protect the ends of the channels G of each conduit-section, so as to prevent water or moisture gaining access to the ends of the conductors in a conduit-section, I face the ends of the latter with a plate of insulation $l'$ and plate of iron or other suitable material $l^2$, which does not extend downwardly as far as the former, as plainly shown in Fig. 7, and this is done to prevent the contact-points of the plow striking the plates $l^2$ as said contacts travel from one conduit-section to another.

Each side of the conduit-section and the conductor secured thereto is complete in itself, and each conduit-section is therefore independent of or separate from the adjoining sections, and when laid they are separated slightly from one another, as shown in Fig. 1, to provide space between their ends to admit of expansion and contraction under the influence of natural or other causes, and for a like reason the length of the conductors in the conduit-sections is shorter than the latter, as plainly shown in Fig. 3.

To secure the conduit-sections and to couple the conductors together so that two adjoining sections with their inclosed conductors are free to independently expand and contract, as well as for the purpose of gaining easy access to the couplings between the conductors of adjoining conduit-sections, I provide the following instrumentalities: At or near the end of each beam or side of a conduit-section and upon the outer side of the same is secured or provided a vertical double-angled or U-shaped bar $n$, preferably riveted to the beam B, as indicated at $n'$, and which preferably stops short of or does not extend all the way up to the top of the beam or side B, and has a turned-down lip or lug $n^2$, having an elongated slotted opening $n^3$, as shown more plainly in Figs. 11 and 15. In the outer side $n^4$ of bars $n$ are elongated slotted openings $n^5$. Upon the turned-down ends or lugs $n^2$ of bars $n$ of two adjoining conduit-sections rests a top plate or cover $n^6$, having, if desired, elongated slots $n^7$, registering with the bar lug-slots $n^3$, and to the sides $n^4$ of said bars $n$ is secured a face or side plate $n^8$ by means of screws and nuts or bolts $n^9$, passing through elongated slotted openings $n^{10}$ in said plate $n^8$ and through the openings $n^5$ in sides $n^4$ of bars $n$, which openings $n^5$ $n^{10}$ register with one another, as shown more plainly in Figs. 16 and 17. Through the slots or openings $n^7$ in top plate $n^6$ and the openings $n^3$ in lugs $n^2$ of bars $n$ pass bolts $m$, each having a lip $m'$ at its lower end for engagement with the under side of the lugs to hold the top plate $n^6$ securely upon the lugs $n^2$, and which when properly turned provide for ready removal of said top plate for gaining access to a chamber or box N, formed by top plate $n^6$, bars $n$, and face plate $n^8$. The bolts $m$ are more plainly shown in Figs. 11 and 18. Instead of using them, however, a screw may be employed, as illustrated in Fig. 12, in which case the elongated or slotted opening in lugs $n$ is dispensed with. The ends of bars $n$ of boxes N also serve for attaching or securing the braces C thereto, as shown more plainly in Figs. 1 and 15, whereby the ends of the conduit-sections are firmly held or braced to keep its slot thereat at the required width. These chambers or boxes N connect, bridge, or overlap the ends of adjoining conduit-sections and are outside of or laterally arranged in relation thereto to receive the couplings or connections for conductors D. The slots in the top plates $n^6$, face-plate $n^8$, and bars $n$ are provided to permit the conduit-sections or sides to expand and contract independently of one another. The openings $l$ near the ends of the beams or conduit sides B and the strips L, projecting through said openings, are within or inclosed by the boxes N, and these strips are connected by a wire or other suitable flexible conductor $l^4$ (see more plainly Figs. 13 and 16) to couple the conductors of adjoining conduit-sections to complete the circuit of same throughout the line. The conductor-couplings $l^4$ admit of the separate expansion and contraction of each conduit-section or their sides B and of the conductors therein without destroying or impairing any of their screw or fastening devices.

While I have shown special construction of conduit-sections and side boxes at their ends for connecting the sections and for forming traps for the couplings or connections of the conductors, yet I do not limit myself thereto, as various forms of either of the same may be employed without departing from the spirit of my invention. Below the conduit and in line with its bottom slot is preferably laid a trough or sub-conduit P, preferably made of wood and having lateral branches $p$ leading to a sewer or other water-way for conducting or draining off from the conduit any water or débris gaining access thereto.

If desired, instead of using the copper strips L and wire $l^1$ for coupling the conductor-sections D the wire alone may be used, as indicated by dotted lines, Fig. 13, or said coupling may be otherwise provided for as deemed expedient.

No cover need be used for the top of the conduit; but to avoid wear on the top flanges $b$ of beams or sides B, I prefer to use top plates R, as shown, which may be smooth, as shown at R′, Fig. 1, and suitably secured to the beams or their flanges $b$, as desired; or, the upper surfaces of the plates may be corrugated or roughened.

When a trolley or carriage S riding on the top of the conduit is used to support the contacts $s$ for the conductors D, as shown in Fig. 7, the corrugations do not extend all the way across the top plates R but stop short of the inner or slot edge of the same, as shown at $r$, to provide a smooth rib or surface $r'$ for the trolley to ride upon.

The trolley or carriage S may be of any suitable construction. It consists, preferably, of a shank or slot-bar $t$, depending from the roller or wheel frame. Bar $t$ passes loosely through a cross-bar $t'$, and has an adjusting-nut $t^2$ at its lower end, between which and the under side of cross-bar $t'$ is an upwardly-acting spring $t^3$ for imparting corresponding pressure to the contacts $s$ on bar $t'$ and a downward pressure to the carriage S to obtain a better contact between the contacts $s$ and the conductors D and to maintain the same under all conditions of service.

If desired, the bottom flanges $b'$ of the beams B may be dispensed with, or they may be on the outside of the beams, as indicated by dotted lines, Fig. 14, in which case the beams may be bolted to the cross-ties, as shown.

A slotted conduit with electrical conductors constructed and laid as above described provides a line of conduit composed of separate sections, each composed of two separate sides or beams, each having separate lengths of conductors extending from end to end of the beam or side, or nearly so, outside couplings for connecting the conduit-sections or their sides, and corresponding electric connections or couplings for the conductor lengths to admit of independent contraction and expansion of the conduit-sections or their sides and of the conductors, and when the latter are compound conductors composed of two different metals their different ratios of expansibility are also provided for. Any one of the conduit-sections or their sides or beams with attached conductor length is, therefore, readily removable from the line of conduit for repairs or other purposes without disturbing the adjacent sides or sections, and the couplings for the lengths of the conductors are accessible without necessitating admission to the conduit-sections.

The traps or boxes N for the conductor-couplings differ from those described and claimed in a pending application of even date herewith, Serial No. 203,655, in that the traps in this last-named application are in line with and form part of the conduit, and are mainly provided to admit of inserting the traveling current collector or plow into and withdrawing it from the conduit, while the traps or boxes N above described are located outside of and connect the ends of adjoining conduit-sections and are so constructed that they admit of independent expansion and contraction of the conduit-sections, and contain connections for coupling the conductors of the conduit-sections, whereby access is obtainable to the conductor-couplings for repairs or other manipulations without taking up any part of the conduit-sections, and therefore without interrupting the travel upon the line. In other words, the traps N correspond to the chambers L on each side of the traps in application Serial No. 203,655 aforesaid.

I am aware that conduit-sections having lengths of conductors are old; but these differ from my invention in that both sides of the conduit-sections are integral with the bottom of the conduit-sections, whereas in my case each side is separate from and has no connection with the other.

What I claim is—

1. In an electric railway, a slotted conduit composed of separate sections, each section composed of separate sides, and each side having a length of electrical conductors extending from end to end of the side, or nearly so, and flexible or yielding circuit-connections between the conductor ends of succeeding sections, substantially as set forth.

2. As a new article of manufacture, an electric-railway slotted conduit side consisting of a beam or bar having a horizontal top flange on one side of the same, angle-iron F, secured to said flange, and a length of electric conductor secured to said beam below said flange and extending from end to end of the beam and having free ends for circuit-connections, substantially as set forth.

3. As a new article of manufacture, an electric-railway slotted conduit side consisting of a beam or bar having on one side a horizontal top flange, an edge flange depending from said top flange and extending from end to end of the beam, and an electric conductor secured to said beam below said horizontal flange and extending from end to end of the beam and having free ends for circuit-connections, substantially as set forth.

4. In an electric railway, a slotted conduit composed of separate sections each having separate side beams or bars, each having a separate length of electrical conductors of the same length as the conduit-sections and lateral braces for retaining each side beam in position, substantially as set forth.

5. A slotted conduit composed of sections and each section composed of separate side bars or beams having at their upper parts an inclosed gutter or channel G, located to one side of the slot of said sections, in combination with electric conductors located or inclosed within said gutters or channels, substantially as set forth.

6. A slotted conduit beam or side B, having top flange $b$, and angle-bar F, secured to under side of said flange, substantially as set forth.

7. A beam for slotted conduits, having top flange $b$, combined with bar E and angle-bar F, arranged to form a gutter beneath said flange, substantially as and for the purpose set forth.

8. A beam or side for slotted conduits, having top flange $b$, angle-bar F, to form a gutter beneath said flange, and end plates $l'$ $l^2$, to close the ends of said gutter or protect the ends of an electric conductor in the gutter, substantially as set forth.

9. A beam or side for a slotted conduit, having top flange $b$, provided on its under side with a gutter in which is secured a length of electrical conductor extending nearly from end to end of the beam and having bottom contact-surface and separate plates or blocks at each end of the conductor to protect its ends, substantially as set forth.

10. The combination, with a bar or beam having on one side top and bottom flanges, of an angle-bar extending the length of the beam and riveted thereto and a conductor secured to the angle-bar, substantially as set forth.

11. The combination, with a bar or beam having on its upper side a laterally-projecting flange and a depending lip or bar on said flange extending the length of the beam, of a conductor located between said lip and side of the beam, substantially as set forth.

12. A side or beam for a slotted conduit, having top flange $b$, in combination with angle-bar F, blocks $g$, having top and bottom countersunk screw-openings, and conductor D, substantially as set forth.

13. A slotted conduit-section having flanges $b$, angle-bars F, secured to said flanges, insulating-blocks $g$, secured to bars F, and conductors secured to the blocks, substantially as set forth.

14. A slotted conduit-section having separate lengths of electrical conductors secured to insulating-blocks, and the latter secured to the conduit, and rubber or elastic plates or pads inserted between the conductors and blocks and between the latter and conduit, substantially as set forth.

15. In an electric railway, a slotted conduit composed of separate sections, each composed of separate side beams or bars having approaching top flanges, each beam having a separate length of electrical conductor, and separate top plates for said beams or bars, substantially as set forth.

16. In an electric railway, a slotted conduit composed of separate sections having removable top plates R, provided with lengthwise ribs $r'$ adjoining the slot between said plates, in combination with a contact-plow S, having a roller or wheeled carriage adapted to move along on ribs $r'$, substantially as set forth.

17. In combination with a slotted conduit having electrical conductors, a trolley or carriage having a slot bar or shank, a transverse bar loose upon said shank and having contacts with the conductors, and upwardly-acting pressure device on said shank below the cross-bar, substantially as set forth.

18. In combination with a slotted conduit, electrical conductors located in said conduit, a trolley or carriage traveling on the top of the conduit and having a slot bar or shank, a transverse bar loose upon said shank and having upward-pressure contacts with the conductors, and adjusting devices for regulating said pressure, substantially as set forth.

19. In an electric railway, a line of conductors, a contact plow having a loose cross-bar provided with contacts, and upward-pressure devices located below the cross-bar, as set forth.

20. The combination, with a slotted conduit having top plates provided with ribs $r'$ adjoining the slot of the conduit, of a trolley or carriage traveling on ribs $r'$, and having a slot-bar provided with an upwardly-acting spring $t^3$ and adjusting-nut $t^2$, and a loose cross-bar $t'$, with contacts located above said spring, substantially as set forth.

21. A slotted conduit composed of separate sections placed end to end with a space between their ends, electrical conductors in said sections, and side couplings connecting the adjacent ends of adjoining sections to admit of their independent expansion and contraction, substantially as set forth.

22. A slotted conduit composed of sections laid end to end and separated from one another, and coupling boxes or traps N, having slotted sides and bolt-connections with the ends of adjoining conduit-sections or their sides to admit of their expansion and contraction, substantially as set forth.

23. In an electric railway, a slotted conduit composed of separate sections having end coupling boxes or traps N, loosely secured together so as to slide upon one another, separate loosely affixed or sliding electric conductor-sections for the conduit-sections, and free coupling wires or connections in boxes N and passing into the conduit-sections for completing the circuit between the conductors of adjoining conduit-sections, substantially as set forth.

24. In an electric railway, a slotted conduit composed of separate sections connected by boxes or traps N so as to slide upon each other, separate lengths of electric conductors loosely affixed to the conduit-sections so as to slide or move therein independently of the conduit-sections, and freely-supported couplings or bridges for the ends of the conductors, whereby said conductors and conduit-sections expand and contract independently of each other, substantially as set forth.

25. A slotted conduit composed of sections each of which has near its ends lateral openings $l$, lengths or sections of conductors in each section, loose or free coupling-wires $l^4$, passing through openings $l$ for circuiting the conductors of adjoining conduit-sections, and boxes or traps N for said coupling-wires, substantially as set forth.

26. In an electric railway, a slotted conduit composed of separate sections, each section having separate lengths of electrical conductors and separate couplings for the conduit-sections, and separate electric couplings for the lengths of conductors to allow of independent expansibility of the conduit-sections and lengths of conductors, substantially as set forth.

27. The compound electric conductor D, composed of two superposed plates $d\ d'$, of different metals, each having registering elongated openings and fastening devices therefor to allow for different ratios of expansibility, substantially as set forth.

28. A compound electrical conductor composed of two superposed plates of different degrees of hardness and having elongated slots or openings and fastening devices to allow for the different ratios of expansibility, substantially as set forth.

29. A compound electrical conductor composed of two superposed plates of different degrees of hardness, and one of which has a groove in its lower or outer side for contact with a traveling current-collector, substantially as set forth.

30. A compound electrical conductor composed of a flat or smooth plate or bar of copper and a plate or bar of iron or steel having an under or outer contact side and both plates having elongated slots and connecting-bolts, substantially as set forth.

31. In combination with a support, the conductor-plates $d$ and $d'$, of different metals, having elongated slots and fastening devices to allow for different ratios of expansibility, substantially as set forth.

32. A slotted conduit having depending slot-flanges $f$ and end plates $l'$, for closing and protecting the ends of channels or ways formed by said flanges, substantially as set forth.

33. A slotted conduit having depending slot-flanges $f$ and end plates $l\ l'$, for closing and protecting the ends of the ways or channels between the sides of the conduit and flanges $f$, substantially as set forth.

34. In a slotted conduit composed of sections and coupling boxes or chambers N at the ends of the sections composed of end pieces $n$, secured to the conduit-sections and having slotted openings $n^3\ n^5$, side plate $n^8$, top plate $n^6$, and fastening devices $n^7$ and $n^9$ for said parts to allow the conduit-sections to expand and contract, substantially as set forth.

35. As a new article of manufacture, an electric-railway slotted-conduit side consisting of a beam or bar having adjacent to each end a lateral opening and on one side a horizontal top flange, and an electric conductor secured to said beam below said flange and extending from end to end of the beam and having end pieces passing through said openings for circuit-connections, substantially as set forth.

36. A slotted conduit composed of sections, each section composed of separate sides having a length of electric conductor, coupling-boxes N for said sides, and electric couplings or bridges for the ends of the conductor-lengths, whereby the sides of the conduit-sections expand and contract independently, substantially as set forth.

In testimony whereof I affix my signature in presence of two witnesses.

WILLIAM M. SCHLESINGER.

Witnesses:
JOHN RODGERS,
S. J. VAN STAVOREN.